United States Patent
Yamanashi et al.

(10) Patent No.: US 6,772,493 B2
(45) Date of Patent: Aug. 10, 2004

(54) WORKPIECE CHANGING SYSTEM

(75) Inventors: Koji Yamanashi, Shimizu (JP); Takashi Fujii, Minamitsuru-gun (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 09/885,924

(22) Filed: Jun. 22, 2001

(65) Prior Publication Data

US 2001/0054223 A1 Dec. 27, 2001

(30) Foreign Application Priority Data

Jun. 23, 2000 (JP) ........................................ 2000-189575

(51) Int. Cl.$^7$ .............................. B23Q 3/02; B66C 1/00
(52) U.S. Cl. ........................... 29/33 P; 29/563; 29/423; 269/309; 269/63; 414/226.02; 414/226.05; 414/816; 409/221; 409/224
(58) Field of Search ................................ 29/33 P, 563, 29/564, 423; 414/725, 736, 226, 762, 786, 783, 754, 816, 226.02, 226.05, 226.04; 269/118

(56) References Cited

U.S. PATENT DOCUMENTS

| | | | | | |
|---|---|---|---|---|---|
| 3,657,963 | A | * | 4/1972 | Miller | 269/20 |
| 3,917,249 | A | * | 11/1975 | Constantine | 269/58 |
| 4,462,579 | A | * | 7/1984 | Satake | 108/20 |
| 4,667,805 | A | * | 5/1987 | Antoszewski | 269/118 |
| 4,685,661 | A | * | 8/1987 | Slocum et al. | 269/156 |
| 4,726,576 | A | * | 2/1988 | Siniko | 269/71 |
| 4,809,425 | A | * | 3/1989 | Monforte | 29/26 A |

(List continued on next page.)

FOREIGN PATENT DOCUMENTS

| | | | | |
|---|---|---|---|---|
| DE | 4027895 | * | 3/1992 | 29/33 P |
| JP | 58-191932 | | 12/1983 | |
| JP | 61-38844 | * | 2/1986 | 29/563 |
| JP | 62-259749 | * | 11/1987 | 29/33 P |
| JP | 64-56938 | | 4/1989 | |
| JP | 3-202248 | * | 9/1991 | 29/563 |
| JP | 05-131335 | | 5/1993 | |
| JP | 05-56343 | | 7/1993 | |
| JP | 5-245728 | * | 9/1993 | 901/45 |
| JP | 07-060591 | | 3/1995 | |
| JP | 7-155871 | * | 6/1995 | 29/33 P |
| JP | 8-206931 | * | 8/1996 | 29/700 |
| JP | 08-243873 | | 9/1996 | |
| JP | 63-225024 | * | 9/1998 | 29/33 P |
| JP | 2001-101958 | * | 4/2001 | 29/711 |

OTHER PUBLICATIONS

Patent Abstracts of Japan, Publication No. 06190651, publication date Jul. 12, 1994.
Patent Abstracts of Japan, Publication No. 08168934, publication date Jul. 2, 1996.
European Search Report; mailed Aug. 26, 2002; Application No. 01305501.7–2302–.
Notice of Grounds of Rejection for corresponding application JP 2000–189575.

*Primary Examiner*—Erica Cadugan
(74) *Attorney, Agent, or Firm*—Staas & Halsey LLP

(57) ABSTRACT

A workpiece changing system capable of automatically changing a heavy workpiece using a robot. A jig for attaching a workpiece thereto is mounted on a jig mounting device. The jig mounting device comprises a jig mounting unit having a rotary member and a swing member. The rotary member rotates the jig and the workpiece on the jig and hold them at a desired rotary position. The tilting member swings around an axis to tilt the jig and the workpiece on the jig and hold them at a desired tilting position. As the jig and the workpiece on the jig can take a suitable orientation or posture for being handled by the handling robot, the handling robot can hold a heavy workpiece without exerting excessive load on the robot wrist.

12 Claims, 11 Drawing Sheets

U.S. PATENT DOCUMENTS

| | | | |
|---|---|---|---|
| 4,844,678 A | * | 7/1989 | Schenk ........................ 414/226 |
| 4,988,261 A | * | 1/1991 | Blatt .......................... 108/143 |
| 5,074,741 A | * | 12/1991 | Johansson ................... 414/736 |
| 5,219,264 A | * | 6/1993 | McClure et al. ............... 901/47 |
| 5,239,160 A | * | 8/1993 | Sakura et al. .......... 219/121.82 |
| 5,293,179 A | * | 3/1994 | Ichikawa et al. ........... 414/786 |
| 5,312,220 A | * | 5/1994 | Torii et al. ................... 414/736 |
| 5,365,810 A | * | 11/1994 | Inaniwa et al. ............... 81/430 |
| 5,509,777 A | * | 4/1996 | Crorey et al. ............. 414/749.1 |
| 5,525,776 A | * | 6/1996 | Okamoto ................ 219/121.68 |
| 5,539,981 A | * | 7/1996 | Burcham et al. ......... 29/447 X |
| 5,586,387 A | * | 12/1996 | Nakatani et al. ............... 29/703 |
| 5,588,794 A | * | 12/1996 | Panyard ...................... 414/729 |
| 5,608,847 A | * | 3/1997 | Pryor .......................... 901/31 |
| 5,810,344 A | * | 9/1998 | Nishimoto .................. 269/309 |

* cited by examiner

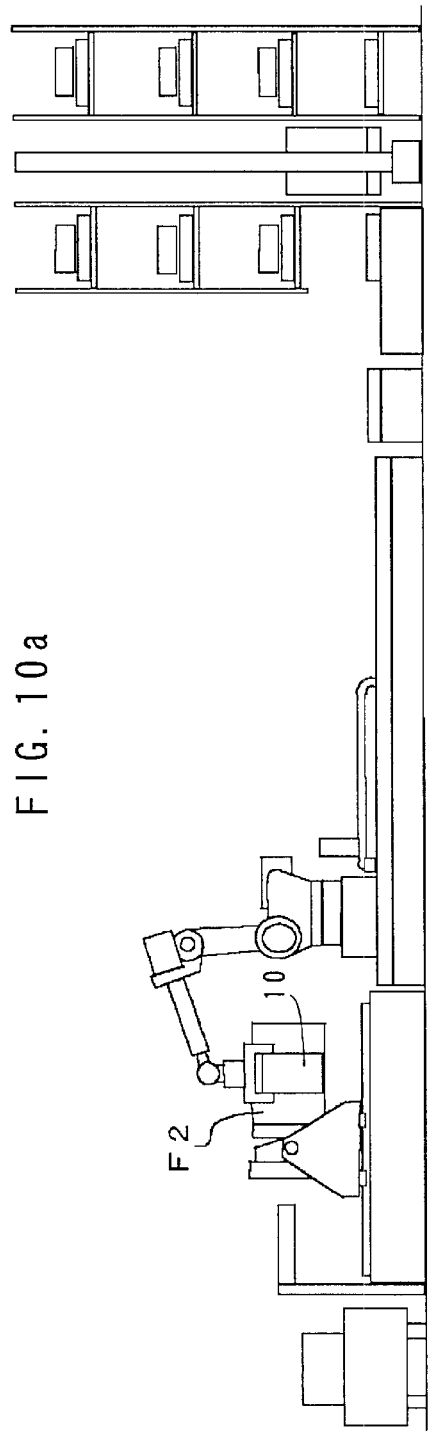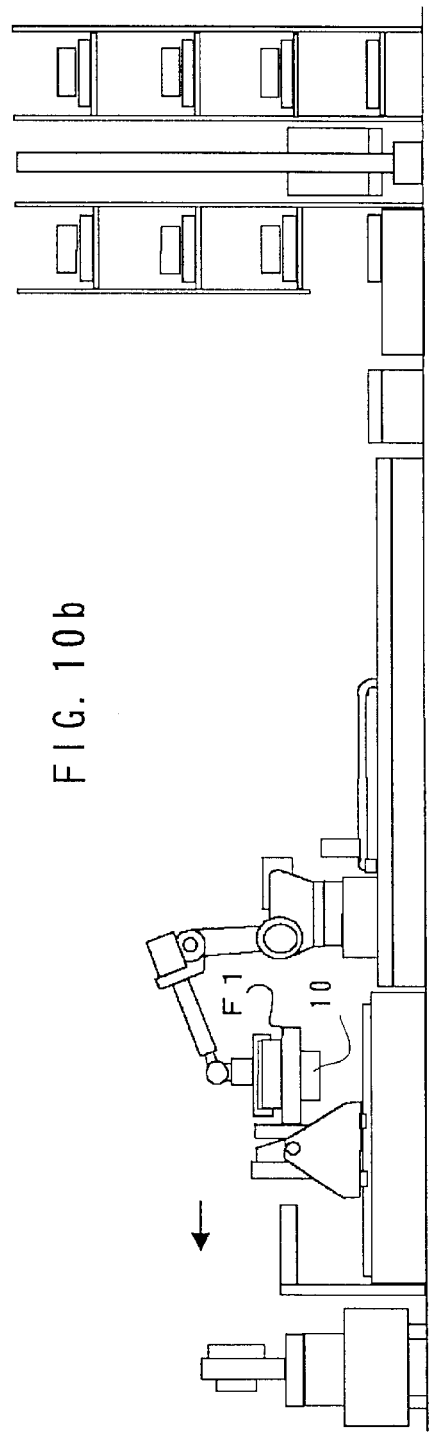

US 6,772,493 B2

WORKPIECE CHANGING SYSTEM

BACKGROUND OF THE INVENTION

1. Field of the Invention

The present invention relates to a workpiece changing system for changing workpieces for machining by a machine tool, etc., using a robot for handling a workpiece.

2. Description of the Related Art

As a method of mounting an un-machined workpiece or a partly machined workpiece on a jig, there is known a method in which male screws are inserted into female screws formed on the workpiece from behind of the jig and brought into engagement with the female screws to fix the workpiece on the jig by threaded engagement of the screws. Since positions of the female screws formed on a workpiece are different depending on a kind of product to be obtained, the mounting of a workpiece on the jig has to be performed manually and thus it has been hardly possible to change a workpiece by a robot.

Further, in the case of handling a heavy workpiece by a robot, large moment is applied to joint axes of a robot wrist when the robot wrist changes its orientation. Since load capability of the joint axes of the robot wrist is relatively small with respect to the joint axes of the other parts of the robot, it is not desirable to change orientation of the robot wrist with the heavy workpiece held thereon. It has been required to change the orientation of the robot wrist in mounting and dismounting a workpiece on the jig by a robot, and therefore it has been difficult to adopt a robot for changing the heavy workpiece on the jig.

SUMMARY OF THE INVENTION

An object of the present invention is to enable automatic attaching and detaching of a heavy workpiece on a jig using a robot. Further, the present invention enables automatic clamping and unclamping of a workpiece on a jig by a robot to realize a full automatic operation of changing workpieces.

A workpiece changing system of the present invention is for attaching a workpiece to be machined on a jig and/or detaching a machined workpiece from the jig by holding the workpiece with a robot hand attached to a handling robot, and comprises: a jig mounting device including a mounting unit on which the jig is mounted; fixing means for fixing the jig on the mounting unit; and orientation changing means for changing an orientation of the jig on the mounting unit so that an orientation of the jig conforms with an orientation of the workpiece held or to be held by the robot hand in attaching/detaching of the workpiece on/from the jig. The orientation changing means may comprise rotating means for rotating the jig mounting unit and tilting means for tilting the jig mounting unit.

The workpiece changing system may further comprise: a pull bolt attaching/detaching robot having a pull bolt attaching/detaching device for attaching/detaching pull bolts on/from the workpiece by threaded engagement with threaded holes formed on the workpiece, the workpiece with the pull bolts attached being positioned on the jig by the handling robot, a pulling hydraulic cylinder device with a position arranged at said jig; a ball lock mechanism connected to the piston of the pulling hydraulic cylinder device for locking a distal end of the pull bolt, whereby the workpiece is fixed and positioned on the jig by a hydraulic pulling force of the piston. Thus, the attachment/detachment of the workpiece on/from the jig is automatically performed.

The pull bolt attaching/detaching device may comprise a holding mechanism for holding a pull bolt, an engaging member to be engaged with the pull bolt held by said holding mechanism so as to transmit a rotational torque to the pull bolt, and a pushing mechanism for pushing the engaging member to be engaged with the pull bolt.

The workpiece changing system of the present invention may further comprise an automatic storehouse for storing workpieces to be machined and machined workpieces, and in this case the handling robot may handle a workpiece to be machined taken out from the storehouse to attach the workpiece on the jig mounted on the jig mounting device, and handle the machined workpiece to detach the machined workpiece from the jig mounted on the jig mounting device and transfer the machined workpiece to the automatic storehouse to be automatically stored therein. Also, the handling robot may handle a workpiece to be machined taken out from the storehouse to attach the workpiece on the jig mounted on the jig mounting device in cooperation with the pull bolt attaching/detaching robot.

BRIEF DESCRIPTION OF THE DRAWINGS

FIGS. 10a and 10b are continuation of FIGS. 9a and 9b;

DETAILED DESCRIPTION OF THE PREFERRED EMBODIMENTS

Figure 1:
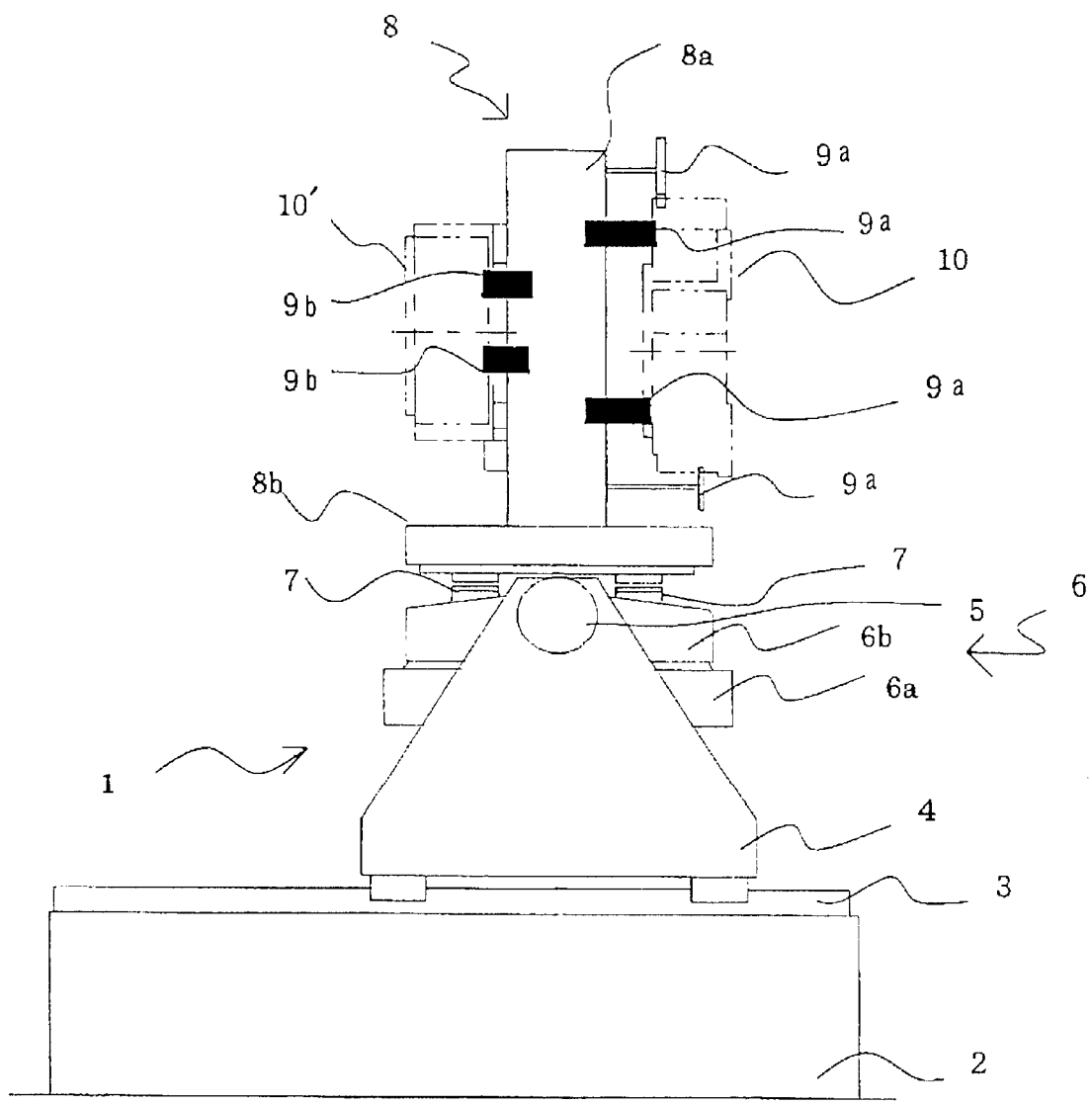
FIG. 1 is an elevation view of a jig mounting device according to the present invention.
Figure 6:
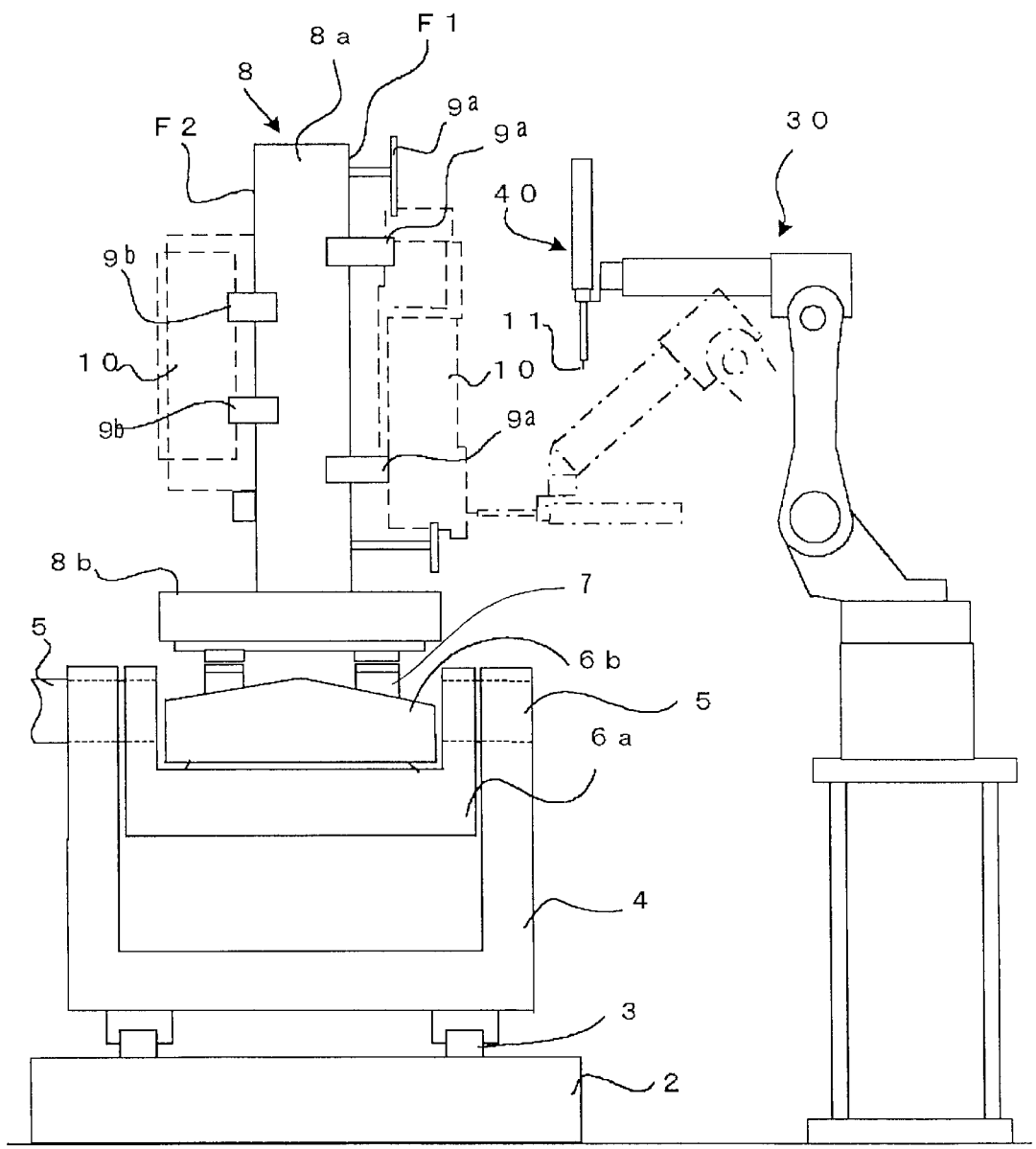
FIG. 6 is a side view of the jig mounting device shown in FIG. 1.

FIG. 1 is a front elevation of a jig mounting device 1 according to one embodiment of the present invention, and FIG. 6 is a side elevation of the jig mounting device 1 viewed from a right-hand side in FIG. 1.

The jig mounting device 1 is arranged linearly movable along a linear motion guide 3 on a base 2. A basement 4 of the jig mounting device 1 comprises two side boards and a bottom board interconnecting the side boards with an upper side thereof opened, as shown in FIG. 6. Two pivot shafts 5 are respectively supported rotatably at upper portions of the side boards and a swing member 6a is fixed to the pivot shafts 5 so as to swing and tilt the jig 8 on the jig mounting unit 6. The swing member 6a comprises two side boards and a bottom board interconnecting the side boards and integrally formed therewith. A rotary member 6b is rotatably mounted on the bottom board of the swing member 6a so as to rotate the jig 8.

At least one of the pivot shafts 5 is operatively connected to a motor through a transmission mechanism so that the swing member 6a fixed to the shaft 5 swings to tilt the jig mounting unit 6 by rotation of the shaft 5 by the motor. In this embodiment, a servomotor is employed as the motor for driving the pivot shaft 5 so that the jig mounting unit 6 is held at a desired angular position. Also, although not shown in the figures, an appropriate mechanism for rotationally driving the rotary member 6b using a motor (a servomotor in this embodiment) is provided so that the rotary member 6b is held at a desired rotational position.

Fixing device 7 for fixing the jig 8 on the jig mounting unit 6 by means of hydric pressure are provided on the rotary member 6b. Conventional fixtures may be employed as the fixing device 7.

The jig 8 comprises a main body 8a to which two workpieces 10 and 10' are attached in this embodiment and a machine pallet 8b to which the main body 8a is fixed. The jig 8 is fixedly mounted on the jig mounting unit 6 by fixing the machine pallet 8b on the rotary member 6b by the fixing device 7.

The main body 8a of the jig 8 is provided with conventional hydraulically-driven clamps 9a and also screw clamps 9b as described later, and the workpieces 10 and 10' are clamped on opposite sides of the main body 8a, i.e., right-hand and left-hand sides in FIG. 1. In this embodiment, the two workpieces 10 and 10' are identical to each other but attached to the main body 8a with their orientations rotated by 90° with respect to each other.

Since the workpieces 10 and 10' are attached to the jig 8 with the clamps, at least one side of the workpiece 10 is used for the attachment and therefore it is necessary to detach the workpieces from the jig 8 and change posture of the workpieces and then reattach the workpieces with the changed posture on the jig 8 in order to machine the whole sides, e.g. six sides of a hexahedral workpiece. Thus, the machining process of a workpiece is divided into a plurality of stages such as a first machining stage, a second machining stage, . . . . In this embodiment, the workpiece 10 to be subjected to first machining is attached to a first attachment face F1 of the main body 8a and the workpiece 10' to be subjected to second machining is attached to a second attachment face F2 of the main body 8a.

Workpieces to be subjected to only one machining process may be attached to both faces of the main body 8a, and further only one workpiece may be attached to one face of the main body 8a.

FIGS. 2a–2c and FIGS. 3a–3c show an operation of the jig mounting device 1.

Figure 2A:
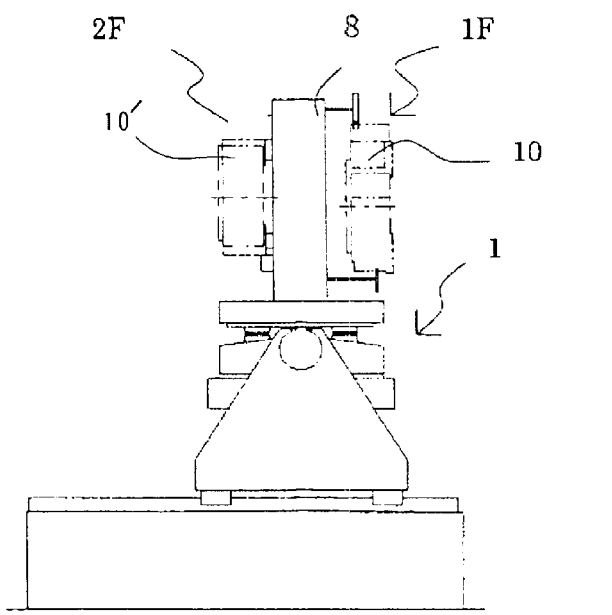
FIGS. 2a–2c are elevation views showing operations of the jig mounting device shown in FIG. 1.
Figure 2B:
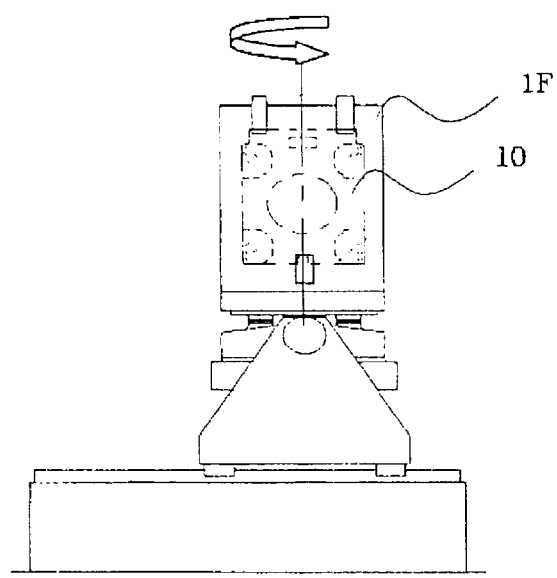
Figure 2C:
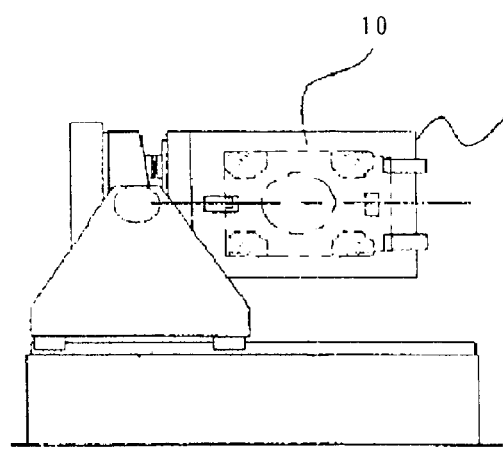

FIG. 2a shows a state of the jig mounting device 1 on which the jig 8 is mounted. FIG. 2b shows a state after the jig 8 is rotated by 90° in the direction of the arrow by a rotary motion of the rotary member 6b in the state of FIG. 2a. FIG. 2c shows a state after the jig 8 is tilted 90° by a swing motion of the swing member 6a in the state of FIG. 2b. In the state shown in FIG. 2c, the jig mounting device 1 has been linearly moved from the position in FIG. 2b so that the positions of the workpieces 10 and 10' attached to the jig 8 are changed to the positions where a robot handles the workpieces 10 and 10'.

Figure 3A:
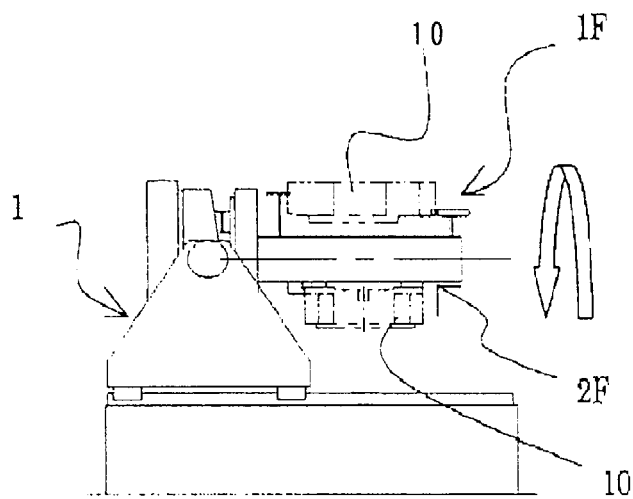
FIGS. 3a–3c are elevation views showing operations of the jig mounting device shown in FIG. 1.
Figure 3B:
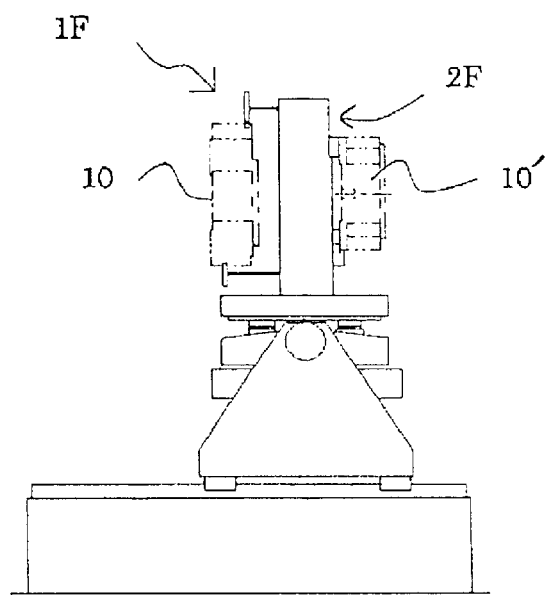
Figure 3C:
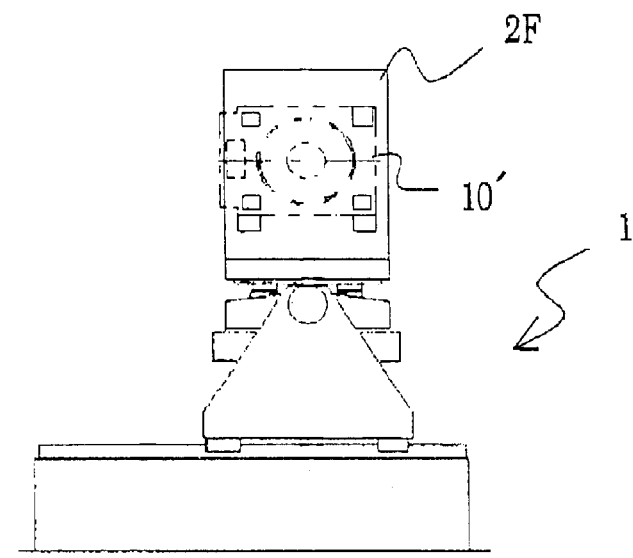

FIG. 3a shows a state after the jig 8 is rotated by 90° in a direction of the arrow in the state of FIG. 2c. FIG. 3b shows a state after the jig 8 is tilted by 90° in the reverse direction in the state of FIG. 3a to stand up the main member 8a. FIG. 3c shows a state after the jig 8 is rotated by 90° in the state of FIG. 3b in the same direction of the arrow in FIG. 2b.

Since the swing member 6a and the rotary member 6b are driven by servomotors, the jig 8 can be held at a desired angular position by actuating the swing member 6a and the rotary member 6b by the servomotors.

As described with reference to FIGS. 2a–2c and FIGS. 3a–3c, an orientation or posture of the workpieces 10 and 10' can be changed with the rotary and tilt motions of the jig 8 by the jig mounting unit 6. The orientation of the jig 8 is changed so that a hand 20a of a handling robot 20 can hold the workpiece 10 or 10' on the jig 8 with an orientation of a robot wrist where the minimum load is applied to the wrist axes when attaching and detaching the workpiece 10 on and from the jig 8, and also suitable for transferring and storing the workpiece into the storehouse.

Figure 4:
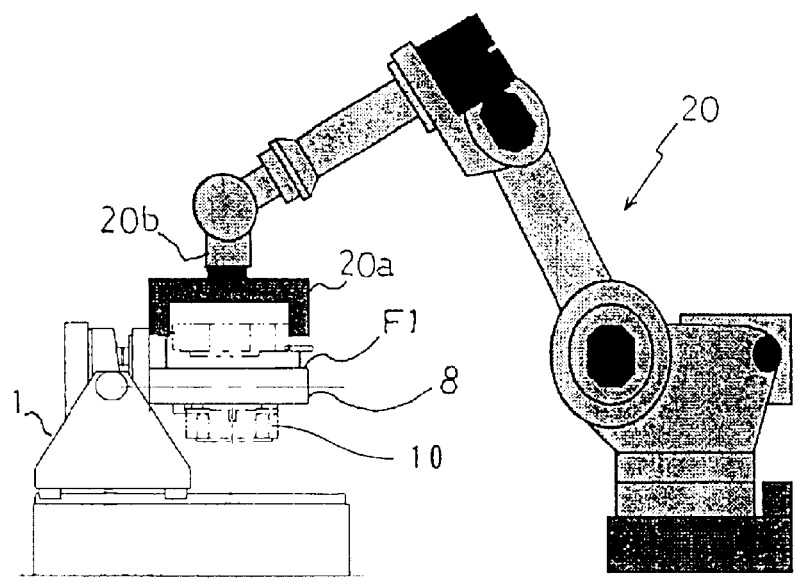
FIG. 4 is a schematic view showing a workpiece changing operation by a handling robot and the jig mounting device.
Figure 5:
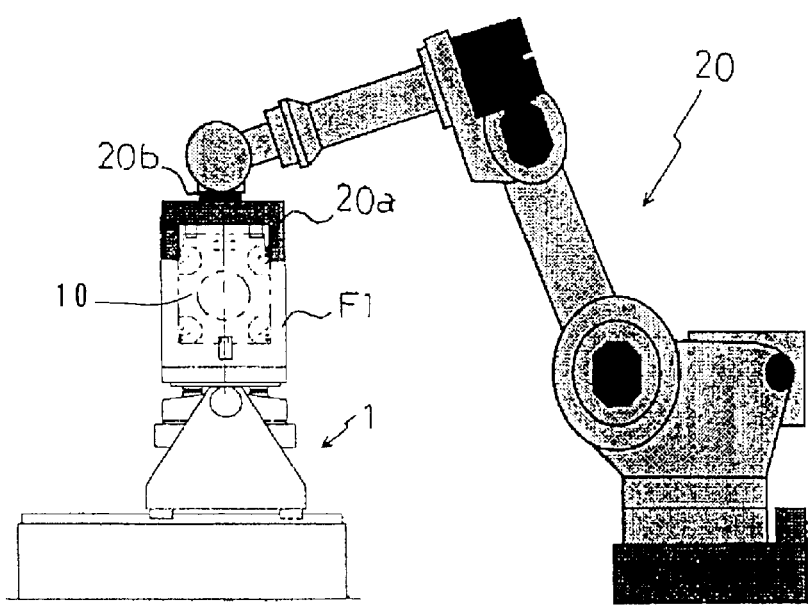
FIG. 5 is a schematic view showing a workpiece changing operation by a handling robot and the jig mounting device.

For example, as shown in FIGS. 4 and 5, the orientation of the jig 8 in attaching/detaching of the workpiece 10 is selected to conform with the orientation of the workpiece 10 to be handled by the hand 20a of the handling robot 20. In the examples shown in FIGS. 4 and 5, the workpiece 10 is held by the hand 20a with the orientation of the wrist directed downward at the state where the minimum load is applied to the wrist axes. Thus, the heavy workpiece 10 can be held and transported without exerting excessive moment on the axes of the wrist 20b, to release operators from a burden of changing the heavy workpiece.

Further, with the jig mounting device 1, a clamping work of a workpiece on the jig 8 can be performed by a robot using a clamping device 9b by means of screws. Conventionally, screws have to be rotationally driven from a back side of the jig for clamping the workpiece on the jig, to make the clamping work by a robot hardly possible. However, the jig mounting device 1 enables clamping of the workpiece on the jig by a robot, to realize automatic changing of the workpiece.

According to the present invention, in advance of the clamping of the workpiece on the jig, pull bolts are fixedly screwed on the workpiece and the workpiece is clamped on the jig by pulling the pull bolts fixed on the workpiece towards the jig to enable the clamping operation by a robot.

FIG. 6 shows attaching and detaching operations of the pull bolts 11 on the workpiece 10 by a pull bolt attaching/detaching robot 30. Female screws for attaching the pull bolts are formed on the workpiece 10 in advance or in the first machining stage. A nut runner 40 for attaching/detaching the pull bolts is attached to a distal end of a wrist of the pull bolt attaching/detaching robot 30. The structure of the pull bolt 11 will be described referring to FIG. 6 and FIG. 7 showing attaching of the pull bolt to the workpiece 10.

Figure 7:
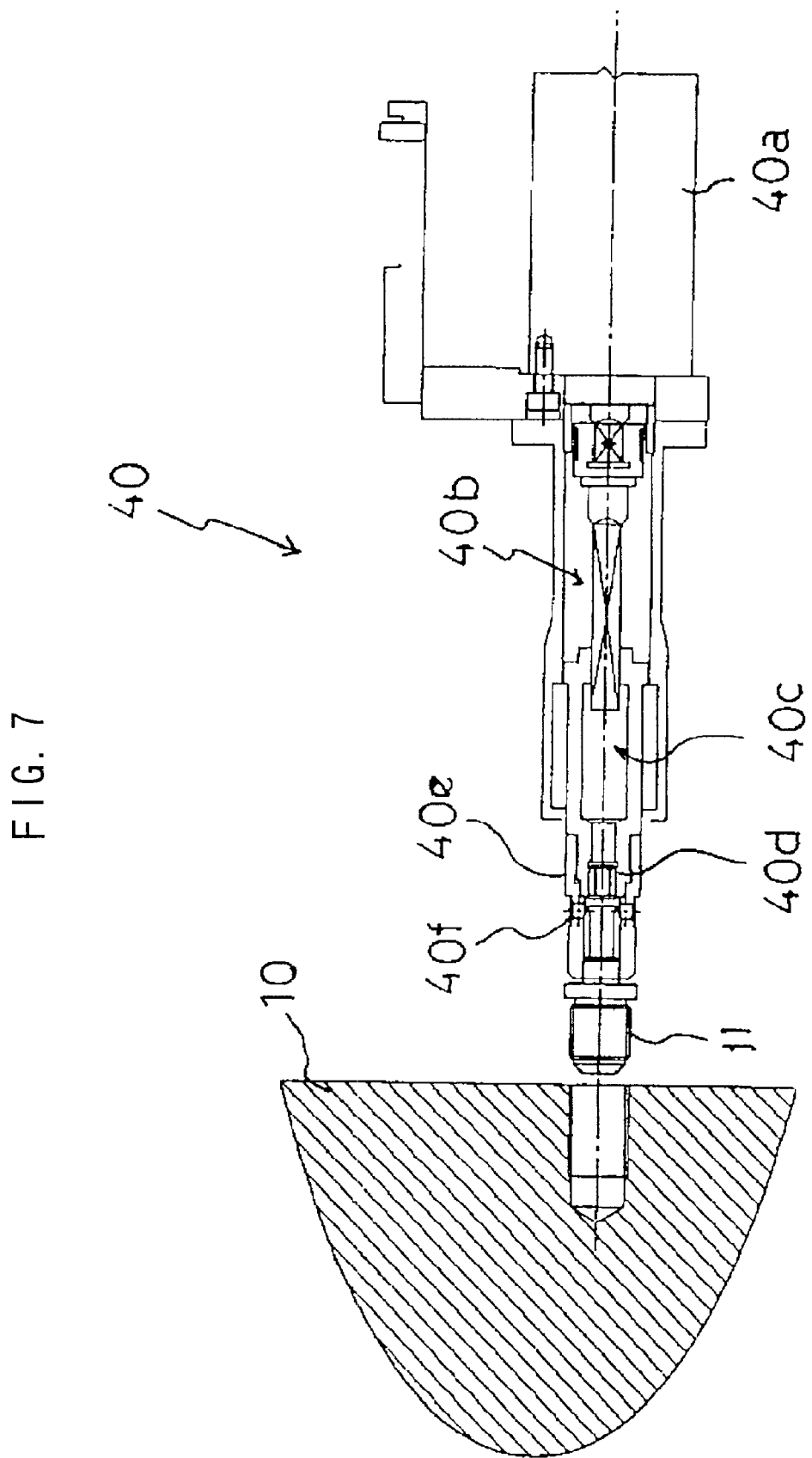
FIG. 7 is an enlarged view of a nut runner as shown in FIG. 6.
Figure 8:
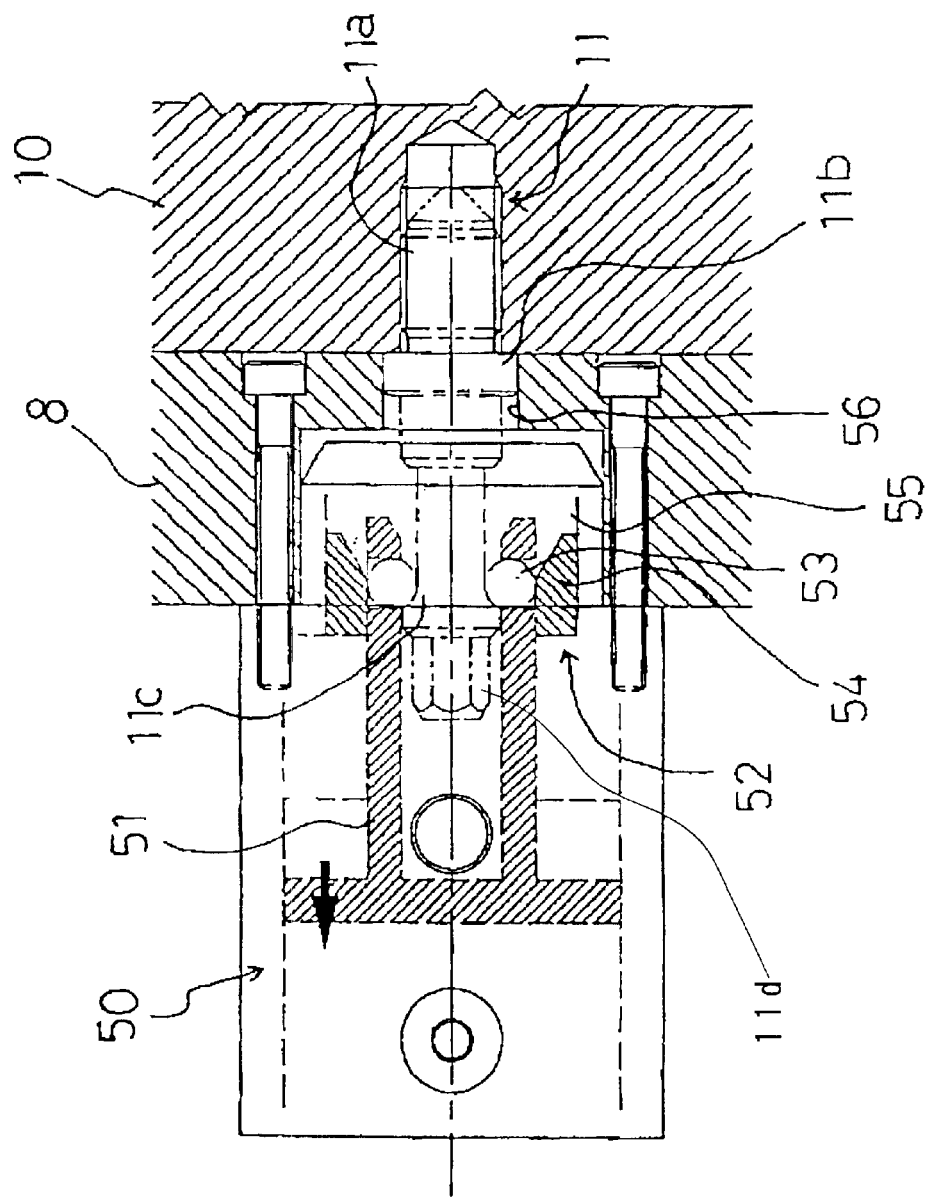
FIG. 8 is a sectional view showing attachment of a workpiece on the jig using pull bolts.

As shown in FIGS. 7 and 8, the pull bolt 11 has a male screw 11a for engagement with a female screw 10a formed on the workpiece 10. A flange 11b is formed at the proximal end of the male screw 11a for abutment with workpiece 10, and a small diameter portion is formed to continuously connect the flange 11b and a large diameter portion near the distal end of the pull bolt 11. The large diameter portion and the small diameter portion in combination form an engaging portion 11c having a curved surface for engaging with balls 53 of a ball lock mechanism 52 and pulling the pull bolt 11 towards the jig 8. At the distal end of the pull bolt 11, a torque receiving portion 11d is formed to receive a screw driving torque. In this embodiment, the torque receiving portion 11d is in the form of a hexagonal head.

The nut runner 40 will be described in detail referring to FIG. 7. A pushing mechanism 40b is connected with an output shaft of a motor (servomotor) 40a as a driving source of the nut runner 40. The pushing mechanism 40b comprises a pipe connected with the output shaft of the motor and a spring disposed in the pipe. An outer periphery of the pipe at the distal end thereof is formed into a polygonal shape and slidably fitted into a polygonal hole formed at a proximal end of a transmission member 40c, so that rotational torque of the motor 40a is transmitted to the transmission member 40c. Further, the transmission member 40c is urged in the axial direction thereof by the spring inserted in the pipe. Thus, the transmission member 40c is rotated by the motor 40a and urged to move outwards by the pushing mechanism 40b. The transmission member 40c has a fitting portion 40d at a distal end thereof with a hole formed into a hexagonal shape to be fitted on the hexagonal torque receiving portion 11d of the pull bolt 11.

Balls 40f are arranged circumferentially in an outer sleeve 40e and urged radially towards a central axis of the nut runner 40 by a ring like spring with a slit. The balls engages with the engaging portion 11c of the pull bolt 11 to securely hold the pull bolt 11 not to be dropped in changing of the orientation of the nut runner 40.

Referring to FIGS. 6 and 7, in attaching the pull bolt 11 on the workpiece 10, the nut runner 40 held by the robot 30 is charged with a pull bolt 11 and the pull bolt 11 is pushed towards a threaded hole formed on the workpiece 10 by the robot. As the pull bolt 11 comes in contact with and pushed by the workpiece 10, the fitting portion 40d of the transmitting member 40c is urged towards the torque receiving portion 11d of the pull bolt 11 by the spring in the pushing mechanism 40b. Then, the transmitting member 40c is rotated by the motor 40a by a predetermined angle, e.g., one revolution, at a low speed. As the fitting portion 40d rotates in contact with the torque receiving portion 11d of the pull bolt 11, the fitting portion 40d is fit into and engaged with the torque receiving portion 11d.

After the torque receiving portion 11d is engaged with the fitting portion 40d, the pull bolt 11 rotates with the pushing mechanism 40b while being urged towards the workpiece 10 to start threaded engagement between the female screw formed on the workpiece 10 and the male screw 11a of the pull bolt 11. Subsequently, the pull bolt 11 is rotated at a high speed by the motor 40a and the male screw 11a is fitted in the female screw to make the flange 11a abut with the surface of the workpiece 10 to increase the rotational torque of the motor 40a. When the increase of the rotational torque (driving current) of the motor 40a is detected, the drive of the motor 40a is stopped and the nut runner 40 is moved to separate from the pull bolt 11 in the axial direction of the pull bolt 11 by the robot 30. Thereby the balls 40f which are urged towards the axis of the pull bolt 11 by the ring spring are moved in a direction remote from the pull bolt 11 to roll along the shoulder of the engaging portion 11c of the pull bolt 11, so that the nut runner 40 is removed from the pull bolt 11. Thus, the pull bolt 11 is attached to the workpiece 10.

In removing the pull bolt 11 from the workpiece 10, the robot 30 is positioned so that the axis of the nut runner 40 coincides with the axis of the pull bolt 11 attached to the workpiece 10. Then, the nut runner 40 is moved towards the workpiece 10 along the axis of thereof, so that the pull bolt 11 is inserted into the outer sleeve 40e and the engaging portion 40d of the transmission member 40c is abutted on the torque receiving portion 11d and urged towards the torque receiving portion 11d by the spring. The engaging portion 40d is rotated by a predetermined angle, e.g. one revolution, at a low speed so that the engaging portion 40d is fitted on the torque receiving portion 11d to transmit the rotation of the motor 40a to the pull bolt 11. Then, the motor 40a is driven at a high speed to remove the threaded engagement between the male screw and the female screw to remove the pull bolt 11 from the workpiece 10.

Thus, the attachment and the detachment of the pull bolt 11 on and from the workpiece 10 an be performed automatically by the robot.

The mounting/dismounting operation of the workpiece 10 on the jig 8 using the pull bolts 11 will be described.

FIG. 8 shows a state where the workpiece 10 with pull bolts 11 attached is mounted or the jig 8. The jig 8 has a pull bolt pulling mechanism for pulling the pull bolt to fix and position the workpiece on the jig 8. The pull bolt pulling mechanism comprises a hydraulic cylinder device 50 and a ball lock mechanism 52 operatively connected to a piston of the hydraulic cylinder device 50. The ball lock mechanism 52 comprises a plurality of balls 53 arranged at a distal end of the piston of hydraulic cylinder device 50, and a fixed member 55 fixed to the jig 8 and having a tapered sleeve 54. The jig 8 has a hole 56 for insertion of the pull bolt 11 and fitting the flange 11b of the pull bolt 11 for positioning of the workpiece 10 with respect to the jig 8. The hydraulic cylinder device 50 is arranged so that a central axis thereof coincides with an central axis of the hole 56.

Before inserting the pull bolt 11 into the hole 56 of the jig 8, the piston 51 of the hydraulic cylinder device 50 is extended outside in the right-hand direction in FIG. 8 to allow the balls 53 to be positioned at a larger diameter portion on the papered sleeve 54. With this state, the pull bolt 11 is inserted into the hole 56, so that the torque receiving portion 11d and a shoulder of the engaging portion 11c of the pull bolt 11 pass the ball 53 and are inserted into the hole of the piston 51. Then, the hydraulic cylinder 50 is actuated to move the piston 51 remote from the pull bolt 11 in the left-hand direction indicated by the arrow in FIG. 8, and the balls 53 are moved along a tapered surface of the tapered sleeve 54 to project inwardly towards the axis of the pull bolt 11. The shoulder of the engaging portion 11c is caught by the balls 53 and pulled in the direction indicated by the arrow. Thus, the workpiece 10 with the pull bolt 11 fixed is pulled towards the jig 8 and fixed thereto.

An operation for automatically changing a workpiece using the jig mounting device 1 will be described as a workpiece handling system for automation of transfer and changing of workpieces, as shown in FIGS. 9–12.

The conventional clamping devices 9a for clamping a workpiece by hydraulically pressing the workpiece towards the jig 8 are employed for clamping a workpiece on the first attaching face F1 of the jig 8 for a first machining process, and the clamping devices 9b using the pull bolts and the pull bolt pulling mechanism are employed for clamping and positioning the workpiece on the second attaching face F2 of the jig 8 for a second machining.

Figure 11:
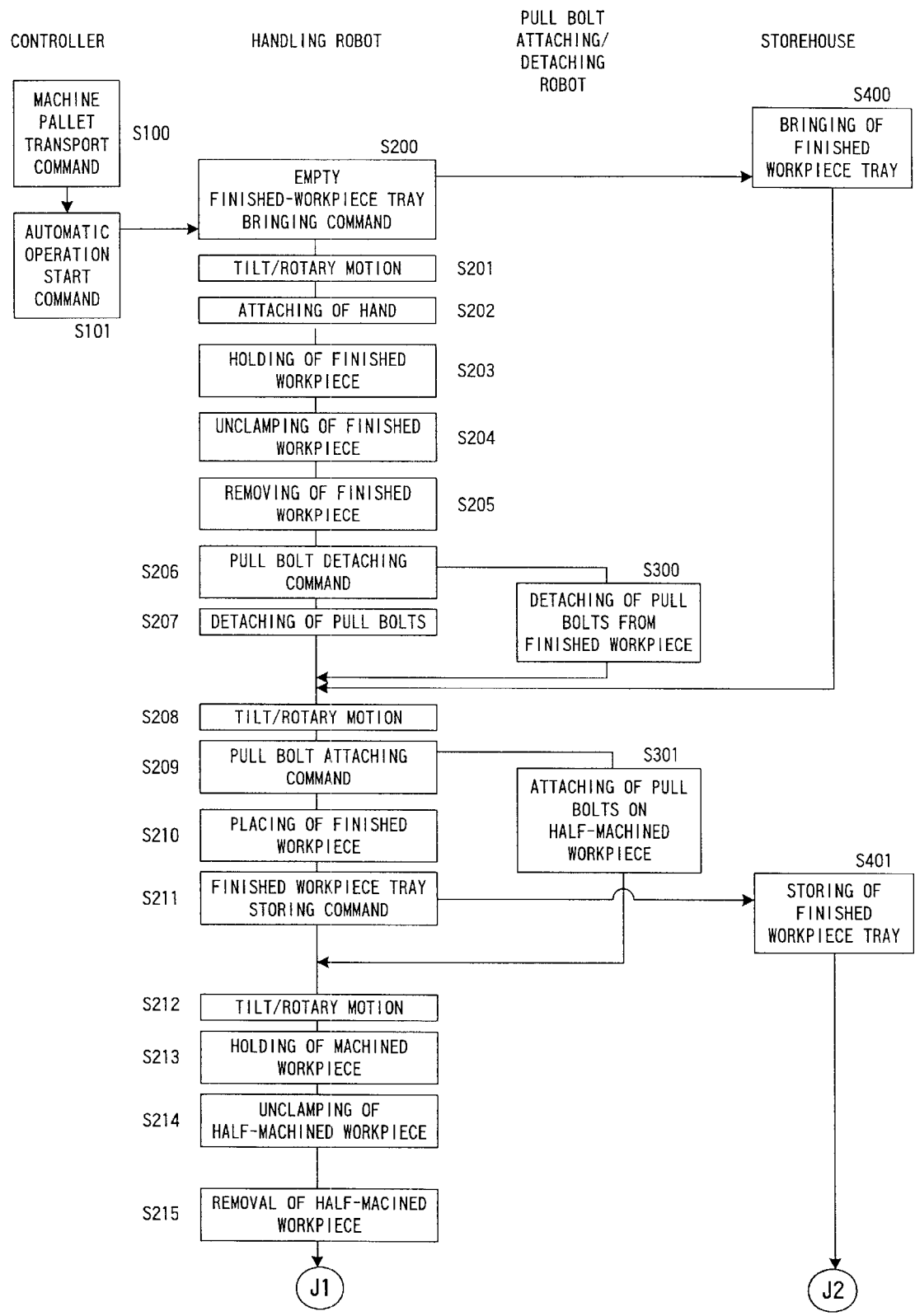
FIG. 11 is a flowchart of operation of the workpiece handling system.
Figure 12:
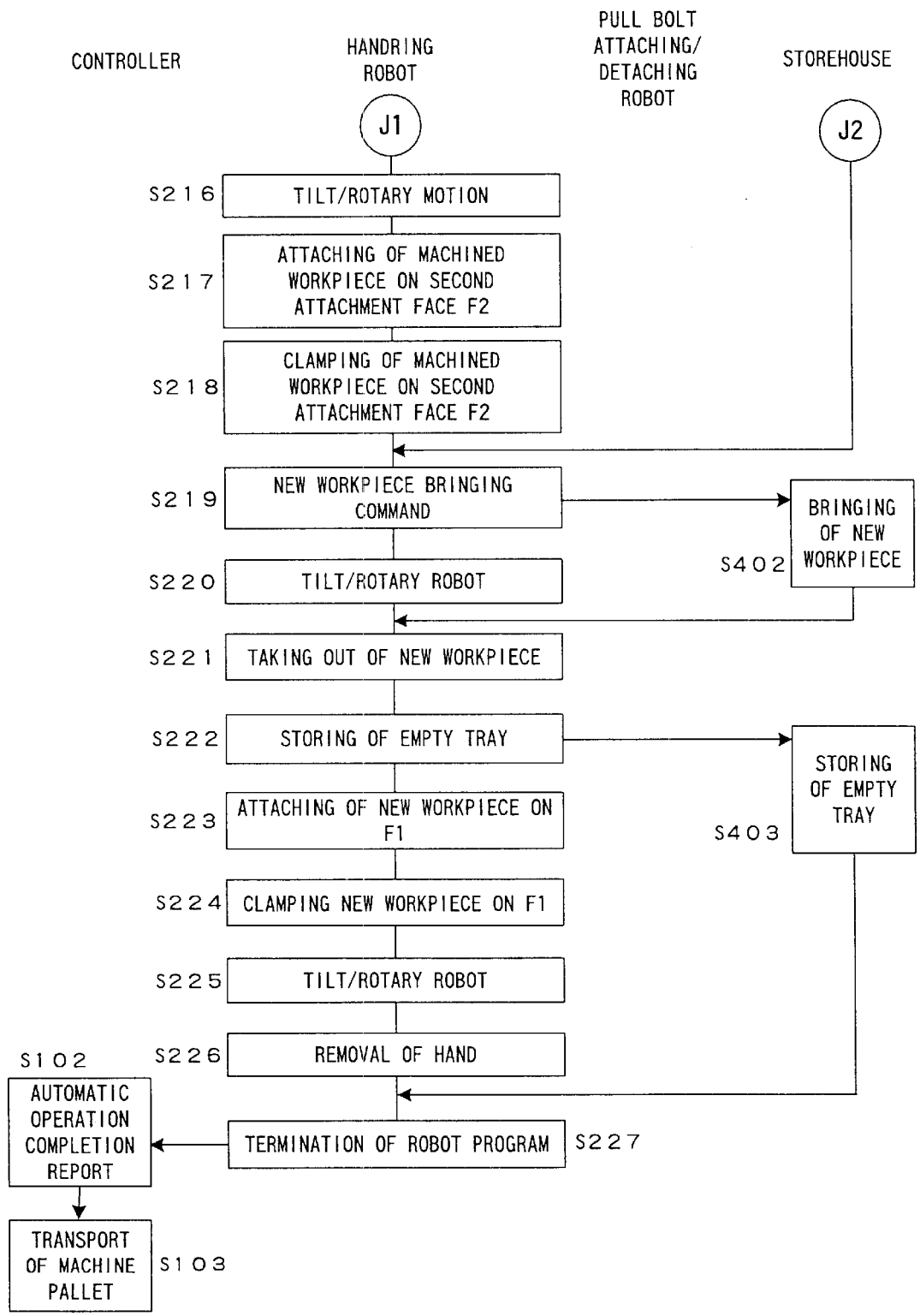
FIG. 12 is continuation of FIG. 11.

FIGS. 11 and 12 show a flow diagram of an operation of the workpiece handling system including a controller for controlling the whole system, the handling robot for mounting/dismounting of the workpiece on the jig and transferring of the workpiece, the pull bolt attaching/detaching robot and the storehouse for store workpieces before machining and workpieces (products) after machining. FIGS. 9a–9b and FIGS. 10a–10b schematically show an operation of the workpiece handling system. Although not shown in FIGS. 9 and 10, the pull bolt attaching/detaching robot 30 is disposed behind the jig mounting device 1.

When a machine pallet transport command is issued from the controller, the jig 8 with the main body 8a and the machine pallet 8b is transported by a carriage 60 to a lift 61 (S100). A workpiece 10 after finishing a first machining and a workpiece 10' after finishing a second machining are mounted on the first and second attachment faces F1 and F2, respectively, of the main body 8a of the jig 8. Then, the controller issues an automatic operation start command to a controller of the handling robot 20 (S101). In response thereto, the controller of the handling robot 20 issues a command for bringing an empty one of finished workpiece placing pallets to the storehouse 70 (S200). In response thereto, a finished workpiece placing pallet is brought to an entrance 71 of the storehouse 70 (S400).

Figure 9A:
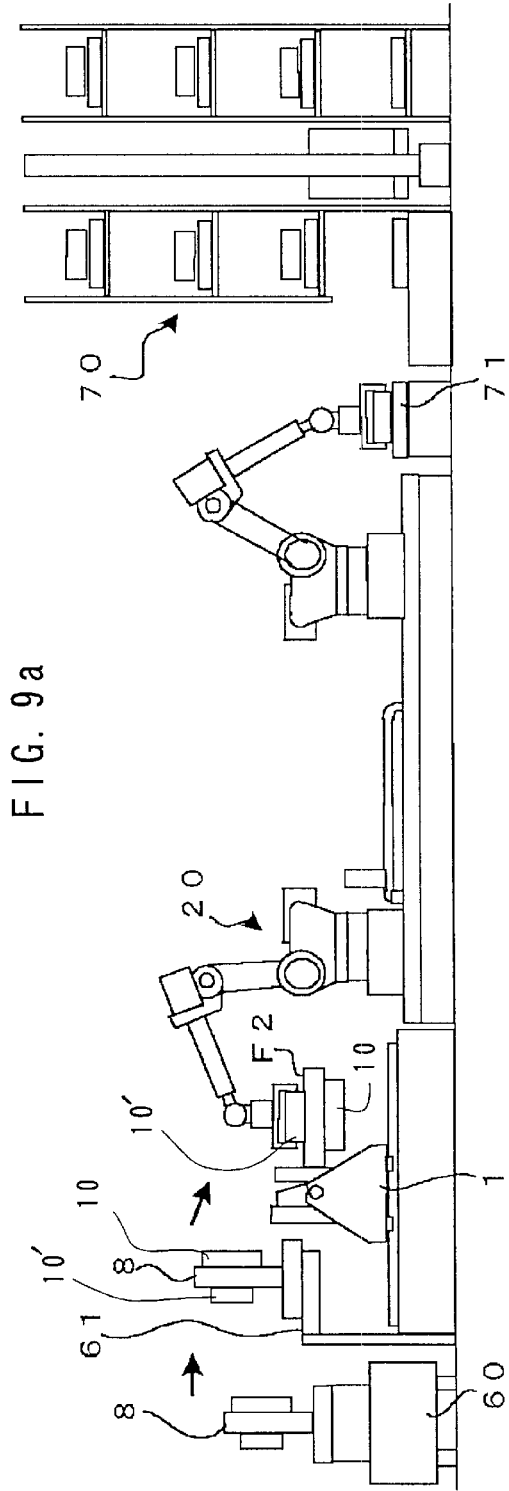
FIGS. 9a and 9b are schematic views showing operations of a workpiece handling system employing the jig mounting device shown in FIG. 1.

Subsequently, the jig mounting device 1 moves to a predetermined position under the lift 61 and then the lift 61 moves downward to place the jig 8 on the jig mounting device 1. The machine pallet 8b of the jig 8 is fixed by the fixing device 7. Then, the jig mounting device 1 moves to a predetermined position for the operations by the handling robot 20 and the pull bolt attaching/detaching robot 30, and performs tilt/rotary motions to make the orientation of the workpiece 10' after finishing the second machining suitable for detaching operation by the handling robot 20 (S201). In this process, the orientation of the workpiece 10' is set to an orientation with which the workpiece 10' is placed on the finished workpiece placing pallet for storage in the storehouse 70 and also with which the workpiece 10' can be held by the hand 20a of the handling robot 20. In this embodiment, the second attachment face F2 of the jig 8 is set upside, as shown in FIG. 9a. A hand for holding a workpiece is attached to the wrist of the handling robot 20 (S202) and the workpiece 10' after finishing the second machining is held by the hand (S203). The hydraulic cylinder 50 of the jig 8 is actuated so that the piston is moved in the right-hand direction in FIG. 8 to release the clamping of the workpiece 10' on the jig 8 (S204).

The handling robot 20 removes the held workpiece 10' from the jig 8 (S205) and issues a command for detaching the pull bolts on the attachment face of the workpiece 10' to the pull bolt removing robot 30 (S206). The handling robot 20 moves the workpiece 10' to the position where the pull bolt attaching/detaching robot 30 can perform a detaching operation of the pull bolts from the workpiece 10' and hold the workpiece 10' at the position (S207). The pull bolt attaching/detaching robot 30 removes the pull bolts from the workpiece 10' by the nut runner 40, as described (S300).

The jig mounting device 1 performs the tilting/rotary motion to make the orientation of the workpiece 10 attached to the first attachment face after finishing the first machining suitable for attaching operation of the pull bolts on the workpiece 10 by the pull bolt attaching/detaching robot 30 (S208) and issues a pull bolt attaching command to the pull bolt attaching/detaching robot 30 (S209). The pull bolt attaching/detaching robot 30 starts the attaching operation of the pull bolts on the workpiece 10 in response to the pull bolt attaching command (S301). This state of the jig mounting device 1 is shown in FIG. 6 where the pull bolts are attached to a first machining face of the workpiece 10 after finishing the first machining by the nut runner 40 of the robot 30.

The handling robot 20 moves to the inlet/outlet place 71 of the storehouse 70 with the workpiece (product) 10' held by the hand and places the workpiece 10' on a product placing tray prepared at the inlet/outlet place 71 (S210) and issues a command for storing the product placing tray to the controller of the storehouse 70 (S211). The finished workpiece mounting tray is stored in the storehouse 70 in response to the command (S401).

Figure 9B:
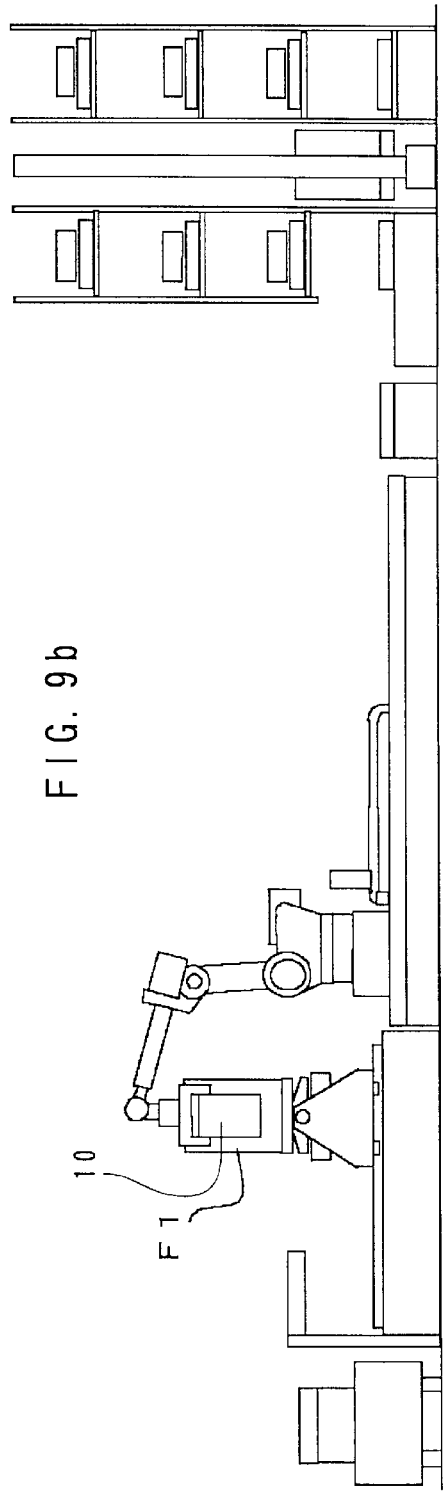

Subsequently, the jig mounting device 1 performs tilting/rotary motion to make the orientation of the workpiece 10 with the pull bolts attached suitable to be held by the handling robot 20 (S212). This state is shown in FIG. 5. Then, the handling robot 20 holds the workpiece 10 (S213) and the clamping of the workpiece 10 on the jig 8 by the clamping device 9a is released (S214). Then, the handling robot 20 removes the workpiece 10 from the jig 8 (S215). This state is shown in FIG. 9b where the hand 20a of the handling robot 20 holds the workpiece 10 when removing the workpiece 10 from the fist attachment face F1 of the jig 8.

Then, the jig mounting device 1 performs the tilting/rotary motion to make the orientation of the second attachment face F2 suitable for attaching the workpiece 10 with the pull bolt attached (S216). Then, the handling robot 20 attaches the workpiece 10 on the second attachment face F2. This state is shown in FIG. 10a.

In this process, the pull bolts attached to the workpiece 10 are inserted into the holes 56 formed on the jig 8 and the workpiece 10 is positioned by the fitting of the holes 56 and the fitting flange 11b (S217). The hydraulic cylinders 50 are actuated to pull the pull bolts towards the jig 8 so that the workpiece 10 is fixed on the second machining face F2 of the jig 8 (S218).

Subsequently, a command for bring a tray with an un-machined new workpiece is issued to the storehouse 70 (S219) and in response to the command a new workpiece on the tray is brought to the inlet/outlet port 71 of the storehouse 70 (S402). The jig mounting device 1 performs a tilting/rotary motion for making the orientation of the first attachment face F1 suitable for attachment of the new workpiece thereto (S220). In this process, the orientation of the first attachment face F1 is determined based on the orientation of the new workpiece with which the workpiece is held by the handling robot 20 when taken out from the storehouse 70 and the holding state of the new workpiece by the handling robot 20. In this embodiment, the orientation of the first attachment face F1 is determined to be directed upward for easily mounting the new workpiece thereon, as shown in FIGS. 4 and 10b.

The handling robot 20 holds up the new workpiece brought to the entrance 71 (S221) and issues a command for storing an empty tray to the storehouse 70 (S222). In response to the empty tray storing command, the storehouse 70 stores the empty tray therein (S403).

The handling robot 20 transfers the new workpiece taken out from the storehouse 70 to the place for attachment of the new workpiece on the jig 8. The handling robot 20 then positions and attaches the new workpiece on the first attachment face F1 of the jig 8 (S223) and the new workpiece is clamped on the first attachment face F1 by the clamping device 9a (S224). The clamping of the workpiece on the first attachment face F1 is carried out by the conventional clamping device 9a for hydraulically pressing the workpiece on the jig 8. This state is shown in FIG. 10b where the new workpiece is to be mounted on the jig 8.

Thus, the new workpiece is attached to the first attachment face F1 of the jig 8 and the workpiece 10 after the first machining is attached to the second attachment face F2. In order to transport the jig 8 with the new workpiece and the workpiece 10 after finishing the first machining, the jig mounting device 1 performs tilting/rotary action to make the jig have the orientation as shown in FIG. 2a, and moves to the position under the lift 61 (S225).

The hand is removed form the handling robot 20 (S226) and the handing robot 20 issues a program termination command to the controller of the system (S227). The controller of the system issues a display command for displaying a completion report of the automatic operation and a command for carrying a machine pallet (S102), and the jig 8 with the workpieces changed is transported by the carriage 60 (S103).

According to the present invention, since the hand of the handling robot can hold the workpiece with an orientation of the robot wrist where the minimum load is applied to the wrist axes when attaching and detaching the workpiece on and from the jig, a heavy workpiece can be attached and detached on the jig and also transferred by the handling robot, to thus reduce burden on operators. Thus, automatic changing of workpieces can be achieved. Further, adopting full bolts for fixing and positioning the workpiece on the jig realizes a full automatic operation of attaching/detaching the workpiece on/from the jig. Furthermore, the present invention provide a full automatic workpiece changing system in which a machined workpiece is automatically changed for a workpiece to be machined by employing the pull bolt attaching/detaching robot and the automatic storehouse.

What is claimed is:

1. A workpiece changing system, comprising:
    a jig to which at least one workpiece to be machined thereon is attached;
    a handling robot, comprising:
        a wrist having wrist axes; and
        a hand, which is connected to the wrist and is rotatable about the wrist axes, for holding a workpiece to place the workpiece to the jig, and/or to remove a machined workpiece from the jig; and
    a jig mounting device including:
        a jig mounting unit on which the jig is detachably mounted;
        fixing means for fixing and unfixing the jig on said mounting unit; and
        orientation changing means for changing an orientation of the jig mounting unit so that an orientation of the jig on the jig mounting unit conforms with an orientation of the workpiece held or to be held by the hand of the handling robot with an orientation of the wrist where a minimum load is exerted on the wrist in placing and/or removing of the workpiece to and/or from the jig.

2. A workpiece changing system according to claim 1, wherein said orientation changing means comprises rotating means for rotating said jig mounting unit and tilting means for tilting said jig mounting unit.

3. A workpiece changing system according to claim 1, further comprising an automatic storehouse for storing workpieces to be machined and machined workpieces, wherein said handling robot handles a workpiece to be machined taken out from said storehouse to attach the workpiece on said jig mounted on said jig mounting device, handles the machined workpiece to detach the machined workpiece from the jig mounted on said jig mounting device, and transfers the machined workpiece to said automatic storehouse to be automatically stored therein.

4. A workpiece changing system for placing a workpiece to be machined on a jig and/or removing a machined workpiece from the jig by holding the workpiece with a robot hand attached to a handling robot via a wrist having wrist axes about which the hand is rotatable, comprising:
    a jig mounting device including:
        a jig mounting unit on which the jig is mounted;
        fixing means for fixing and unfixing the jig on said mounting unit; and
        orientation changing means for changing an orientation of the jig mounting unit so that an orientation of the jig on the jig mounting unit conforms with an orientation of the workpiece held or to be held by the robot hand with an orientation of the wrist where a minimum load is exerted on the wrist in the placing and/or removing of the workpiece on and/or from the jig;
    a pull bolt attaching and/or detaching robot having a pull bolt attaching and/or detaching device for attaching and/or detaching pull bolts on and/or from the workpiece by threaded engagement with threaded holes formed on the workpiece, the workpiece with the pull bolts attached being positioned on the jig by the handling robot;
    a pulling hydraulic cylinder device with a piston arranged at said jig; and
    a ball lock mechanism connected to the piston of said pulling hydraulic cylinder device for locking a distal end of the pull bolt, whereby the workpiece is fixed and positioned on the jig by a hydraulic pulling force of said piston.

5. A workpiece changing system according to claim 4, wherein said pull bolt attaching and/or detaching device comprises a holding mechanism for holding a pull bolt, an engaging member to be engaged with the pull bolt held by said holding mechanism so as to transmit a rotational torque to the pull bolt, and a pushing mechanism for pushing said engaging member to be engaged with the pull bolt.

6. A workpiece changing system according to claim 4, further comprising an automatic storehouse for storing workpieces to be machined and machined workpiece, wherein said handling robot handles a workpiece to be machined taken out from said storehouse to attach the workpiece on said jig mounted on said jig mounting device in cooperation with said pull bolt attaching and/or detaching robot, handles the machined workpiece to detach the machined workpiece from the jig mounted on said jig mounting device, and transfers the machined workpiece to said automatic storehouse to be automatically stored therein.

7. A workpiece changing system according to claim 1, wherein the jig mounting device further includes:
    linearly-moving means for linearly moving the jig mounting unit.

8. The workpiece changing system of claim 1, wherein the rotation means and/or the inclination means are constituted by axes for rotation of the jig and servomotors for rotating the axes through transmission means.

9. The workpiece changing system of claim 1, wherein the jig has a first attachment face for attachment of a workpiece to be subjected to a first machining process and a second attachment face for attaching a workpiece to be subjected to a second machining process after completing the first machining process.

10. The workpiece changing system of claim 1, further comprising:
    a pull bolt attaching and/or detaching robot having pull bolt attaching and/or detaching means for attaching and/or detaching pull bolts on and/or from the workpiece by threaded engagement with threaded holes formed on the workpiece, the workpiece with the pull bolts attached being positioned on the jig by the handling robot;
    a pulling hydraulic cylinder device with a piston arranged at said jig; and
    a ball lock mechanism connected to the piston of said pulling hydraulic cylinder device for locking a distal end of the pull bolt, whereby the workpiece is fixed and positioned on the jig by a hydraulic pulling force of the piston.

11. The workpiece changing system of claim 10, wherein the pull bolt attaching and/or detaching means comprises a holding mechanism for holding a pull bolt, an engaging member to be engaged with the pull bolt held by the holding mechanism so as to transmit a rotational torque to the pull bolt, and a pushing mechanism for pushing the engaging member to be engaged with the pull bolt.

12. The workpiece changing system of claim 10, further comprising an automatic storehouse arranged at a position accessible by the handling robot, wherein the handling robot handles a workpiece to be machined taken out from the storehouse to attach the workpiece on the jig in cooperation with the pull bolt attaching and/or detaching robot, and handles the machined workpiece to detach the machined workpiece from the jig and transfer the machined workpiece to the automatic storehouse.

* * * * *